2 Sheets--Sheet 1.

R. L. COHEN.
Carburetting Gas-Machines.

No. 153,538. Patented July 28, 1874.

Witnesses
Eugene P. Eadson
J. B. Connolly

Inventor
Robert L. Cohen
By Connolly Bros.,
Attorneys.

R. L. COHEN.
Carburetting Gas-Machines.

No. 153,538. Patented July 28, 1874.

Witnesses
Eugene P. Eadson
J. B. Connolly

Inventor
Robert L. Cohen,
By Connolly Bros,
Attorneys.

UNITED STATES PATENT OFFICE.

ROBERT L. COHEN, OF PHILADELPHIA, PENNSYLVANIA.

IMPROVEMENT IN CARBURETING GAS-MACHINES.

Specification forming part of Letters Patent No. 153,538, dated July 28, 1874; application filed April 3, 1874.

*To all whom it may concern:*

Be it known that I, ROBERT L. COHEN, of Philadelphia, in the county of Philadelphia and State of Pennsylvania, have invented certain new and useful Improvements in Gas-Machines or Machines for Carbureting Air; and I do hereby declare the following to be a full, clear, and exact description of the invention, such as will enable others skilled in the art to which it pertains to make and use it, reference being had to the accompanying drawings, which form part of this specification, in which—

Figure 1:
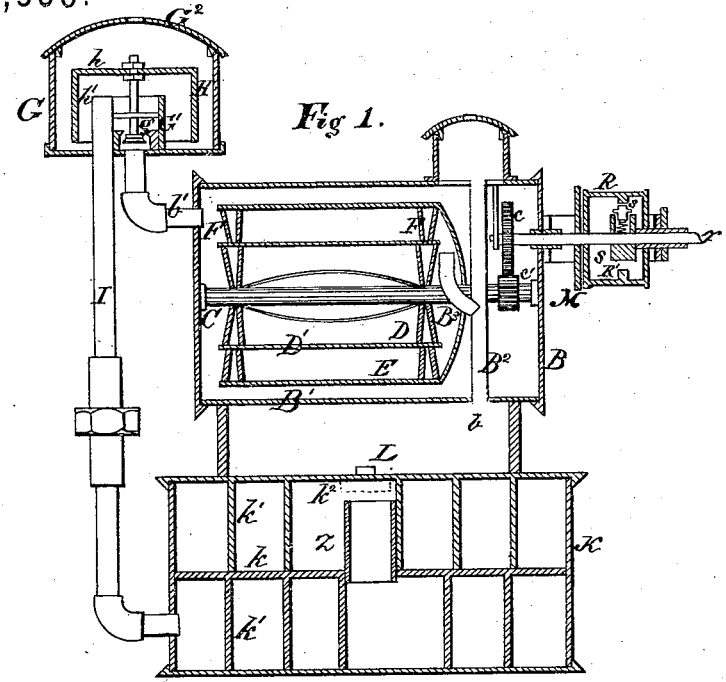
Figure 3:
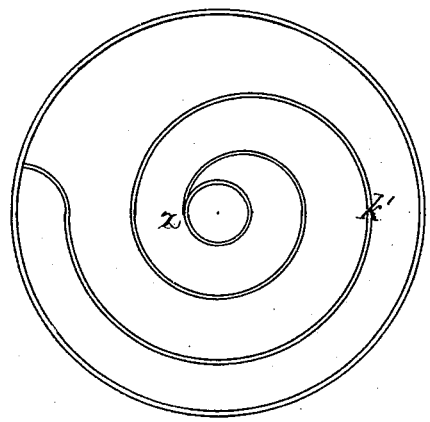
Figure 2:
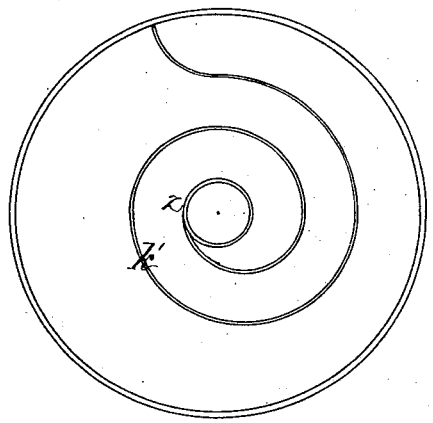
Figure 4:
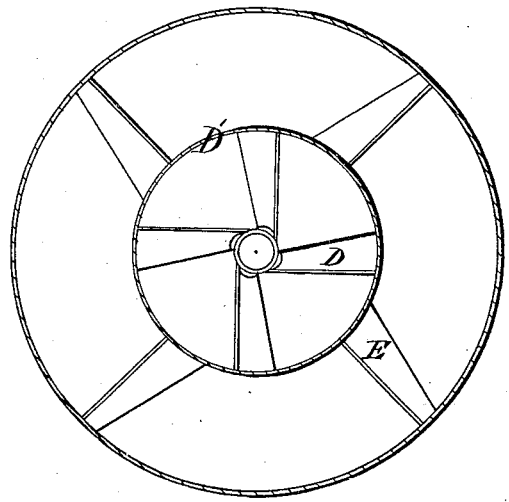
Figure 5:
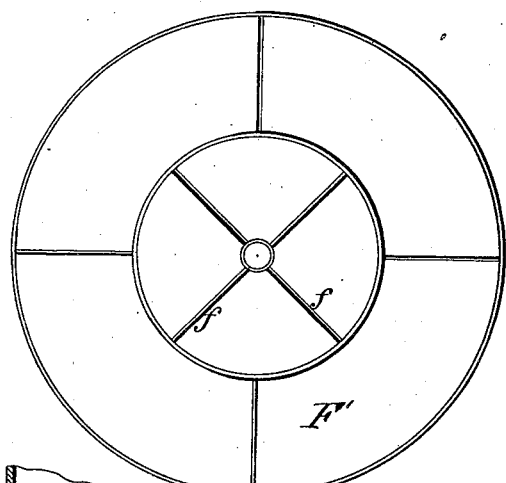
Figure 6:
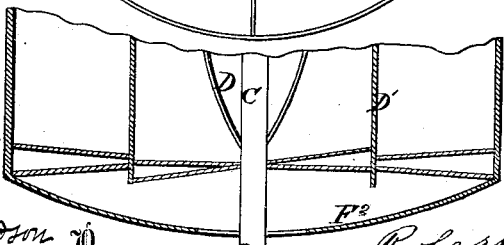

Figure 1 is a vertical section of the machine complete. Figs. 2 and 3 are plans of the vertical partitions in the carbureter. Fig. 4 is a vertical section of blower. Fig. 5 is an end view of same, showing one of the heads. Fig. 6 is an enlarged vertical section of wings of blower and heads of same.

The nature of my invention consists in the peculiar and novel construction and combination of parts, as hereinafter described.

Referring to the accompanying drawings, which illustrate my invention, B represents the fan or blower; G, a valve or gasometer for controlling the flow of air from the blower to the carbureter; K, the carbureter or tank for holding the gasoline; and R the drum, on which is wound the rope for attachment to a weight that imparts the necessary motion to the blower.

My improvements have reference to each of these parts, and I will now describe them in their order, respectively, as mentioned. First, as to the blower. This consists of a cylindrical case, $B^1$, through which passes a supply-pipe, $B^2$, open at top and bottom, and having a branch, $B^3$. C is a shaft gearing, by suitable cog-wheels $c$ $c'$, with the shaft $r$ of the drum. The wheel $c$ should be, as shown, much larger than the wheel $c'$, so that one revolution of the drum will produce at least four revolutions of the blower. D and E represent the wings of the blower located between heads F and $F'$, and divided by an annular partition or cylinder, $D'$. $F^2$ is a supplemental head on the blower-shaft, turning therewith. The wings D and E are curved similar to the blades of a screw-propeller, and are arranged alternately, or so as to break joints, in order that they may not enter or leave the liquid simultaneously. The air for the blower is furnished through the pipe $B^2$ and its branch $B^3$, and leaves through the openings $f f$ in the head $F^1$. The curvature of the wings D and and E gives greater power with less weight than straight wings would, and by providing a double series of these wings, as shown, a steady current of air is obtained and the flickering tendency of the flame usually observed in gas-machines of this class wholly obviated. Should the motion of the wings throw any of the liquid in the blower into the pipe $B^3$ it will be drawn off at $b$, which is a small cock or plug in the lower end of the pipe $B^2$. The air expelled from the blower is conducted by a pipe, $b'$, to the gasometer G, in which is a slide or check valve, $g$. The stem of this valve is extended upwardly and connected with a cylindrical box or casing, H, made up of a head, $h$, and annular flange $h'$. Should the flow of air from the blower become too strong it will cause this casing H to rise, carrying with it and closing the valve $g$. This device acts, therefore, as a governor. The lower end or edge of the flange $h'$ is submerged in liquid held in the case G, forming a water-joint. $G^1$ represents an annular partition in the gasometer G, designed to prevent the liquid therein from entering the valve $g$; and $G^2$ is a lid, having an opening, $g$, for the admission of air. I represents a pipe for conveying the air from the gasometer to the carbureter, entering the latter at or near the bottom. The carbureter is divided horizontally by one or more floors, $k$, and each chamber thus formed is provided with a partition, $k'$, arranged in the form of a scroll or volute. The air from the pipe I enters the carbureter outside the lower partition, and following its circling track around and around at last passes through the floor $k$, entering the center of the upper chamber. Circling as before, but this time from the center to the circumference, it emerges through the casing into a pipe, L, which supplies the burners. The spaces between the coils of the partitions $k'$ are filled with sponge saturated with gasoline, by means of which the air is carbureted. Before leaving the carbureter the air passes over a tank, $k^2$, containing chemicals, by means of which its excess of vapory particles is eliminated and its illuminating properties increased. The drum-shaft r is provided with a block, S, in which is inserted a spring-pawl, s, engaging with a ratchet cut in a rim or disk, R', made fast on the inside of the drum R. This internal arrangement of the pawl prevents the fouling of the rope, and thereby obviates a disarrangement of the device from this as well as from other causes. M represents a milled disk, by means of which the blower may be rotated in the right direction to furnish a due supply of air to the carbureter while the rope is being wound up on the drum, which then moves in the opposite direction, said disk M being fast on the shaft r, and of slightly greater diameter than the drum-heads. The shaft of the drum, it will be seen, is on a higher plane than that of the blower, and hence a water-packing for the former is not required. The intermediate cog-gearing allows the use of a much shorter rope than that ordinarily employed, one revolution of the drum producing several revolutions of the blower. Z represents a stand-pipe rising from the center of the lower division of the carbureter to near the top of the upper. By means of said pipe communication is provided between the two divisions, whereby the air, having traversed the lower is admitted to the upper chamber, and above the gasoline contained therein, while the contents of the two chambers are prevented from commingling. This pipe forms a valuable addition to a carbureter, and causes the air to be more thoroughly carbureted than if dispensed with.

What I claim as my invention is—

1. The combination, with a gas-machine, of the rotary horizontal blower E, constructed with an inner and outer set of curved wings separated by an annular partition, D', the wings of the outer set breaking joints or alterdating with those of the inner set, so as to produce a uniform or continuous current to prevent flickering, substantially as specified.

2. In combination with the case B, containing the rotary blower E of the air-supply pipe $B^2$, passing vertically through said case, and provided with an upwardly-curving branch, $B^3$, as shown, said pipe receiving the entering current through its upper end, substantially as shown, and for the purpose specified.

3. The combination of the pipe Z with the carbureter having the partition k and spiral partitions, as shown, said pipe rising from the center of the lower to near the top of the upper chamber, as and for the purpose specified.

In testimony that I claim the foregoing I have hereunto set my hand this 26th day of March, 1874.

ROBERT L. COHEN.

Witnesses:
 M. DANL. CONNOLLY,
 JNO. A. BELL.